United States Patent

[11] 3,608,974

[72] Inventor Moye Wicks, III
Houston, Tex.
[21] Appl. No. 860,350
[22] Filed Sept. 23, 1969
[45] Patented Sept. 28, 1971
[73] Assignee Shell Oil Company
New York, N.Y.

[54] GELLING ADDITIVE INJECTION ARRANGEMENT FOR PREVENTING PIPELINE SLUMPING
7 Claims, 4 Drawing Figs.

[52] U.S. Cl. .................................................... 302/14, 302/66
[51] Int. Cl. .................................................... B65g 53/30
[50] Field of Search .......................................... 302/14, 15, 16, 66

[56] References Cited
UNITED STATES PATENTS

| | | | |
|---|---|---|---|
| 2,492,173 | 12/1949 | Mysels ......................... | 302/14 X |
| 2,610,091 | 9/1952 | Cross ........................... | 302/14 X |
| 3,400,983 | 9/1968 | Wessel ........................ | 302/14 |
| 3,413,038 | 11/1968 | Frazier ........................ | 302/14 |

*Primary Examiner*—Joseph Wegbreit
*Assistant Examiner*—Bruce H. Stoner, Jr.
*Attorneys*—Thomas R. Lampe and J. H. McCarthy

ABSTRACT: Method and apparatus for preventing downhill slumping in a shutdown slurry pipeline. Upon pipeline shutdown, a gelling agent is introduced into the slurry mixture to prevent the solid phase of the slurry from sliding downhill within the pipeline under the influence of gravity.

INVENTOR:
MOYE WICKS, III
BY:
*Thomas R. Lampe*
HIS ATTORNEY

GELLING ADDITIVE INJECTION ARRANGEMENT FOR PREVENTING PIPELINE SLUMPING

The present invention relates to pipeline transport operations; and, more particularly, to a method and apparatus for preventing the downward movement of slurry solids in an inclined portion of pipeline during a shutdown period.

Transportation by pipeline is a major and growing industry. With the use thereof formerly confined almost entirely to movement of water, gas and petroleum products, pipelines, with the advent of slurry transport, have become useful for long and short hauls of a wide variety of raw materials and finished products.

With respect to the pipeline transportation of materials in slurry form, problems arise when such materials are moved through pipelines inclined to go over a hill or down a valley. At these locations, during a planned or emergency line shutdown, the solids of the transported slurry may settle out vertically and subsequently slide down the inclined portions of the pipeline, thereby causing a compacted plug which may be very difficult to dislodge and move when line shutdown is terminated and transport activities are resumed.

These difficulties can sometimes be avoided by laying solids-carrying or slurry pipelines so that they do not exceed a slope or angle of inclination above which sliding occurs. Alternatively, the pipeline can be emptied at each shutdown. Obviously, these alternative prior art approaches are not always feasible or economical, especially in those situations where long and relatively steep slopes are encountered. Slopes of this mature are being encountered with increasing frequency as pipeline operations are being extended to new relatively inaccessible mountainous areas in the United States and elsewhere.

SUMMARY OF THE INVENTION

It is therefore a primary object of the present invention to provide an improved and economical apparatus and method whereby slurry material being transported in an inclined pipeline section is prevented from slumping during a line shutdown.

This and other objects have been attained in the present invention by providing a method and apparatus for preventing downhill slumping in a shutdown slurry pipeline wherein a gelling agent is injected into the interior of the pipeline at predetermined intervals along sloping portions of the pipeline when the pipeline flow rate falls below some predetermined minimum value. The gelling additive or agent stabilizes the slurry and thus prevents downward sliding or slumping of the slurry solid-phase material. The gel may be any suitable type such as Napalm, for example. According to one form of the present invention, a mechanical device such as a high speed centrifugal pump is utilized to break up some of the slurry solids to form a gel consisting of very small subparticles which may be reinjected into the pipeline to stabilize the rest of the slurry.

DESCRIPTION OF THE DRAWING

The above-noted and other objects of the present invention will be understood from the following description, taken with reference to the accompanying drawing. In describing the invention in detail, reference will be made to the drawings in which like reference numerals designate corresponding parts throughout several views in which:

Referring now to FIG. 1, a given length of slurry pipeline 11 is illustrated in the position assumed thereby as the pipeline proceeds to and from a valley formed between two hills or mountains 12 and 13. The terrain illustrated is typical of that encountered in pipeline-laying activities, although it should be understood that the teachings of the present invention may be carried out in any topographical configuration wherein a portion of slurry pipeline is inclined.

Figure 1:
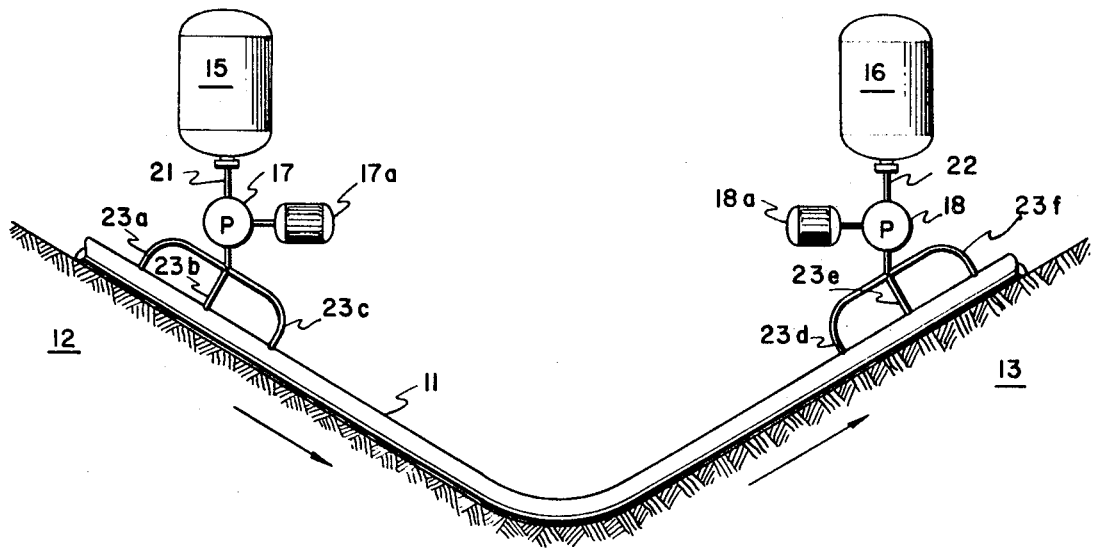
FIG. 1 is a diagrammatic view illustrating a given length of slurry pipeline which has been modified in accordance with the teachings of the present invention.

The transportation of slurries consisting of solid particles in a fluid medium by use of pipelines similar to that disclosed in FIG. 1 is quite well known, and such expedient is finding increasing use, especially in those situations where the source of raw materials is relatively remote and inaccessible from the point of delivery, which may be a suitable processing plant, for example. In the disclosed arrangement, it may be assumed for purposes of illustration that the slurry material being transferred through pipeline 11 as by means of conventional pumps (not shown) is moving through the line in the direction indicated by the arrows. However, the teachings of the present invention are, of course, applicable regardless of the direction of flow of the slurry.

As long as flow continues at or above some critical rate in the pipeline, the solid matter of the slurry will remain in suspension within the pumped liquid, even when the solid matter has a higher specific gravity than the liquid. If, however, the flow is stopped for any reason, i.e., the pipeline is shut down, such solid matter will settle out of suspension. In the situation where the line is horizontal or the slope of the line is insufficient to cause sliding of the settled solids, no problem is created by such settling out. Under these conditions, a liquid-rich channel remains open at the top of the line which allows the settled material to be resuspended with a minimum of difficulty upon resumption of slurry flow.

A serious problem can exist when the pipeline must be inclined to go over a hill or down a valley, as illustrated, for example, in FIG. 1. At these locations, the settling of solids followed by their sliding down the slope during a protracted shutdown can result in a compacted plug of material difficult, if not impossible, to move or resuspend by normal operating procedures. In the illustrated pipeline configuration, such solids would slide downwardly into the valley formed between hills or mountains 12 and 13. The solid material would then compact under its own weight to form a plug in the valley in an obvious manner.

Such plug formation is prevented in accordance with the teachings of the present invention as follows. Disposed adjacent to the sloping portions of pipeline 11 are a plurality of supply vessels or tanks 15 and 16 which contain a gelling agent chemically inert with respect to the slurry material being transported within pipeline 11 and adapted to be injected into said pipeline in a manner to be described below. A wide variety of gelling agents are well known in the literature. For example, in the events the slurry material comprises an oil-sulfur mixture, a gelled or thickened composition such as Napalm may be utilized.

Upon shutdown of pipeline 11, pumps 17 and 18, which are operatively associated with pipelines 21 and 22 leading from the respective interiors of tanks 15 and 16, are operated to pump the gelling agent within the tanks into a plurality of manifold conduits 23a-23f which lead to the interior of pipeline 11 at those locations of the pipeline where slumping of the slurry material solid phase is likely to occur, i.e., the sloping portions of pipeline 11.

Pumps 17 and 18 are operated by actuating prime mover means 17a and 18a which may be of any suitable commercially available type, such as electric motors and are operatively associated with the pumps in a well-known manner.

Figure 2:
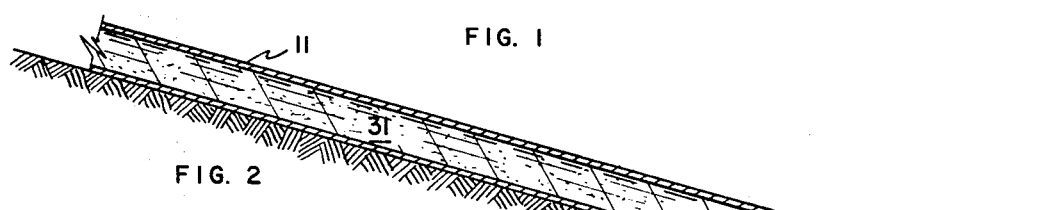
FIG. 2 is an enlarged cross-sectional view in longitudinal projection illustrating an inclined portion of a shutdown pipeline section similar to that of FIG. 1 but not modified in accordance with the teachings of the present invention.

In the event some means such as the introduction of a gelling agent into the interior of pipeline 11 is not utilized to prevent slumping, a plug such as plug 30, shown in FIG. 2, comprising compacted slurry solid-phase material, will be formed in the low points of the pipeline being filled with a fluid-rich slurry as at 31. As previously stated, a compacted slurry solid-phase plug such as that designated by reference numeral 30 may be difficult or impossible to dislodge upon pipeline restart.

Figure 3:
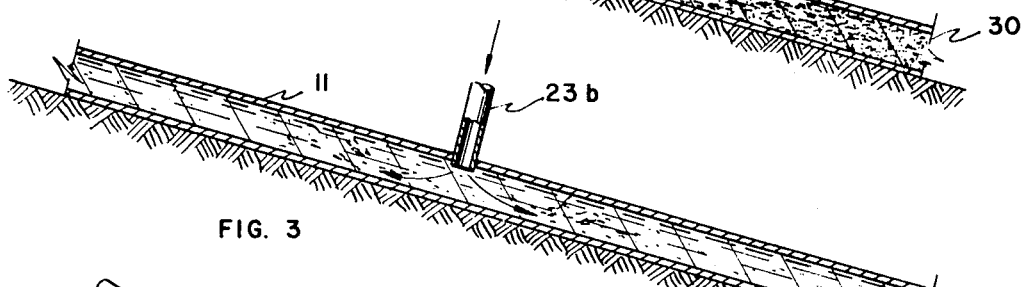
FIG. 3 is a view similar to that of FIG. 2 but illustrating an inclined portion of a pipeline which is in cooperative relationship with the arrangement according to the present invention.

By injecting a suitable gelling agent into the pipeline 11 promptly upon shutdown, however, the slumping of the slurry solid-phase material is prevented. In FIG. 3 the flow of a gelling agent being injected through one representative manifold conduit 23b is shown be means of the arrows. The gelling agent enters the interior of the pipeline 11 and promptly mixes with the slurry material in the line before a substantial part of the slurry solid-phase has had time to settle out. The agitation of the slurry material caused by the gelling agent entering the interior of the pipeline promotes the intermixing between the gelling agent and the slurry material and maintains the solid-phase particles in suspension in the liquid phase until gelling agent injection is terminated. Sufficient quantities of the gelling material are injecting into the pipeline to maintain such solid-phase material in suspended condition to prevent the plug formation. To utilize this arrangement, comparatively little storage is required since the additive concentration in the pipeline necessary to maintain the slurry solid-phase is relatively low; in the order of 1 percent to 10 percent by volume, for example, when the slurry comprises an oil-sulfur mixture and the gelling agent is Napalm or similar material.

Since plug formation is prevented by the above-described expedient, slurry flow may be commenced readily. In the case of Napalm, the gel+s rheological behavior might be adequately described for the present purposes by a Bingham plastic model, typified by a yield stress. For this type of fluid, the relationship between the yield stress, $t_y$, the fluid and solid densities, $p_f$ and $p_s$, and the maximum size particle $D_{max}$, which can be supported is approximately as follows:

$$\tau y = g l/g c \ D_{max}/6(\rho_s - \rho_f).$$

In the case of sulfur and oil where $\rho_s = 125 \ LB/FT^3$, $\rho_f = 50 \ LB/FT^3$, $_{max}$ of 1,000 microns, the above equation shows $$\tau_y = 0.25 \ LB/FT^2.$$

This requires a restart pressure to overcome a 1-mile plug's frictional resistance of only 36 p.s.i. in a 12-inch pipe.

Rather than introduce a foreign gelling agent into the pipeline to carry out the teachings of the present invention, the gelling agent could be conveniently supplied by using a suitable mechanical device such as a high speed centrifugal pump to break up some of the solid particles from the slurry into very small subparticles and injecting these subparticles into the pipeline to stabilize the remainder of the slurry.

The fact that very fine solid particles form a gellike substance is well known (see, e.g., "Lectures on Theoretical Rheology," by M. Reiner, North-Holland Publishing Company, Third Edition, 1960). In order to determine the effectiveness of attrition in causing a substantial increase in the yield-stress of a slurry, a sample of sulfur-in-oil slurry was placed into a 9-foot diameter torus made of 2-inch tubing. The slurry in this case contained a large fraction of irregularly shaped sulfur particles which were easily broken down into smaller particles, although this fact is not intrinsically important to the subject of the present invention. The "wheel" was rotated at a linear velocity (at the pipe centerline) of about 9 feet/ second for an equivalent transport distance of 320 miles. The initial and final properties of the slurry were measured using standard procedures. The results are shown in the following table.

EFFECT OF PARTICLE ATTRITION ON SLURRY RHEOLOGICAL PROPERTIES

% Retained, by weight

| sieve Opening, Microns | Before Attrition | After attrition |
|---|---|---|
| 1190 | 2.6 | 0 |
| 590 | 39 | 30.7 |
| 297 | 37 | 32.1 |
| 149 | 15 | 16.4 |
| 74 | 3.2 | 4.8 |
| 44 | 0.5 | 0.9 |
| −44 | 2.7 | 15.1 |
| 30 | | 0.6 |
| 20 | | 0.7 |
| −20 | | 13.8 |
| Slope Viscosity LB$_f$SEC/ft² | 0.00064 | 0.00378 |
| Yield Stress, LB$_f$/FT² | 0.0017 | 0.323 |

The table shows that a comparatively small percentage of the solids being ground into −20-micron size particles causes a 190-fold increase in the slurry yield stress. The approximate relationship between this increase yield stress and its ability to support particles was given above.

Figure 4:
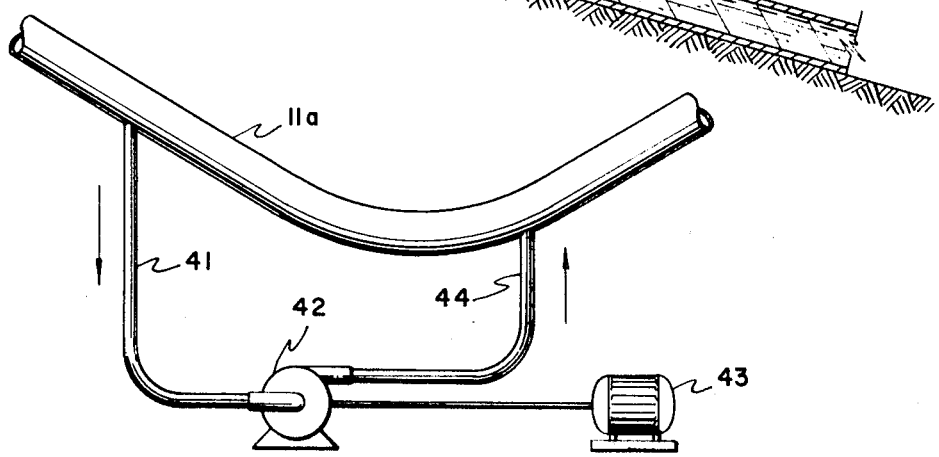
FIG. 4 is a schematic view in longitudinal projection illustrating an alternative form of gelling agent injection arrangement in operative association with a length of slurry pipeline.

FIG. 4 illustrates schematically one form of apparatus which may be used in carrying out this latter approach. A conduit 41 is shown as providing communication between the interior of slurry pipeline 11A and a centrifugal pump or other suitable conventional particle attrition device 42. Device 42 is powered by a suitable prime mover means 43 which is actuated as the slurry flow rate in pipeline 11A falls below some predetermined level. Prime mover means 43 may be either remotely or locally actuated and such actuation may be either manual or automatic using conventional flow rate or line pressure sensors. For example, the arrangement disclosed in copending U.S. application Ser. No. 815,364, filed Apr. 11, 1969, now U.S. Pat. No. 3,548,637 (P-9349 US), may be employed for the purpose of detecting heterogeneous flow conditions.

When device 42 is operation, slurry material is pumped from pipeline 11A through conduit 41 and thence into the pump or device 42. The slurry solid-phase material which has been broken up into small subparticles due to the action of device 42 is pumped through connector line 44 into the interior of pipeline 11A. The subparticles (which are now in the form of a gellike mass) cooperate with the slurry material remaining in the pipeline to hold the slurry solid-phase particles in suspension in the above-described manner until pipeline restart.

A primary advantage of this last-mentioned approach is the availability of the additive; taking it from the pipeline and reinjecting directly requires no elaborate storage and handling equipment. All that is needed in the disclosed suggested embodiment of the approach is a centrifugal pump operated to break up the particles. Use of attrited solids from the slurry makes the recovery process at the pipeline terminus somewhat easier than it would be if a foreign material were employed.

The particle attrition approach, in addition to being used during periods of pipeline shutdown, may also be used in those situations where operation of the pipeline at a lower velocity than would be prudent otherwise is desired. During the period of slower slurry flow rate the attrition arrangement shown in FIG. 4 could be continuously operated to reduce the degree of heterogeneity in the uphill slope pipeline sections.

I claim as my invention:

1. Apparatus for use in combination with a pipeline through which slurry material comprising a solid phase and a liquid phase is transported and said apparatus being adapted to prevent slumping of the slurry material solid phase under the influence of gravity during pipeline shutdown, said apparatus comprising:

means for breaking said slurry material solid phase into small subparticles as a source of gelling agent material;
pump means;
prime mover means operatively associated with said pump means;
first means defining a flow path between said means defining a source of gelling agent material and said pump means; and second means defining a flow path between said pump means and the interior of said pipeline, said prime mover means adapted to operate said pump means to pump said gelling agent material from said means defining a source of gelling agent material through said first and second means and into said pipeline whereby slurry solid phase material within the pipeline is maintained in suspension and plug formation due to compacting thereof is prevented.

2. The apparatus according to claim 1 wherein said second means defining a flow path comprises manifold means in communication with the interior of said pipeline at a plurality of locations along said pipeline where slumping of said slurry solid-phase material under the influence of gravity is likely to occur.

3. The apparatus according to claim 1 wherein said means for breaking said slurry material solid phase into small subparticles is said pump means.

4. The apparatus according to claim 3 wherein said slurry material solid phase which is broken into small subparticles is taken from the interior of said pipeline.

5. A method for preventing downhill slumping of solid-phase material in a shutdown pipeline adapted to transport slurry material including a liquid phase and a solid phase, said method comprising:

establishing a flow path between a source of gelling agent material and the interior of said pipeline;

transporting said gelling agent material from said source along said flow path; and injecting said gelling agent material into said pipeline when the slurry flow rate drops below a predetermined level whereby slurry solid-phase material in said pipeline is retained in suspension by said gelling agent and is prevented from slumping and compacting is said line under the influence of gravity.

6. The method of claim 5 wherein said gelling agent material is Napalm.

7. The method of claim 5 wherein said gelling agent material comprises solid-phase slurry material and said source comprises the interior of said pipeline, said solid-phase material being broken into small subparticles prior to injection into said pipeline.